May 21, 1935.   W. I. TAYLOR   2,002,066
PRODUCTION OF ARTIFICIAL FILAMENTS, THREADS,
RIBBONS, FILMS, AND SIMILAR MATERIALS
Filed Feb. 4, 1932
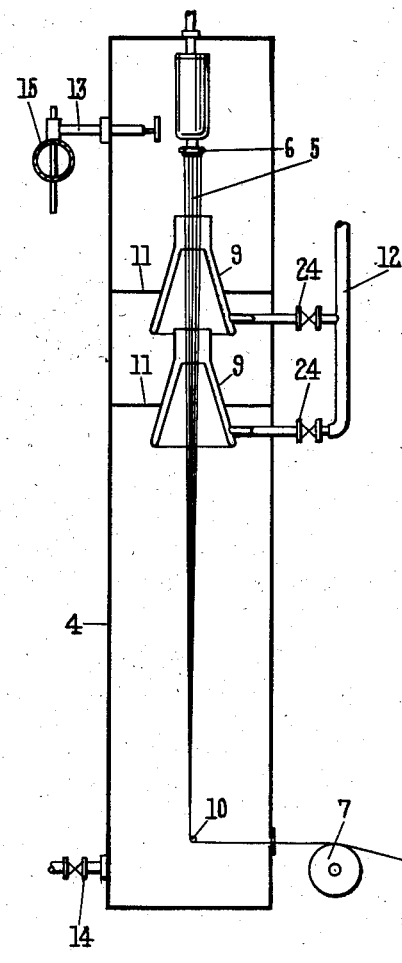
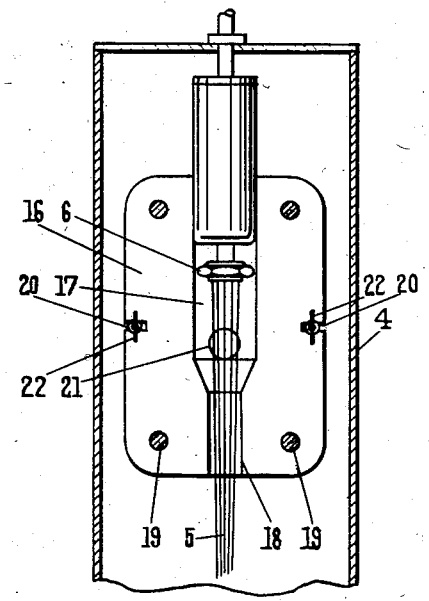
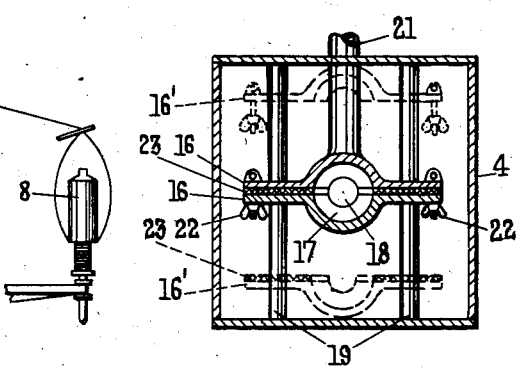
Inventor
William I Taylor
by
I Seltzer and ...
Attorneys.

Patented May 21, 1935

2,002,066

UNITED STATES PATENT OFFICE 2,002,066

PRODUCTION OF ARTIFICIAL FILAMENTS, THREADS, RIBBONS, FILMS, AND SIMILAR MATERIALS

William Ivan Taylor, Spondon, near Derby, England, assignor to Celanese Corporation of America, a corporation of Delaware Application February 4, 1932, Serial No. 590,828
In Great Britain March 27, 1931

9 Claims. (Cl. 18—8)

This invention relates to the manufacture of artificial filaments, threads, ribbons and the like materials, and in particular to materials comprising cellulose acetate or other esters or ethers of cellulose.

It is known that the properties of certain artificial textile materials may be improved by subjecting them at a suitable stage in their manufacture to a tension sufficiently great to stretch them beyond the elastic limit. Thus, for example, the properties of threads and the like of organic esters of cellulose may be improved in respect of strength and resistance to delustring by stretching beyond the elastic limit, as described in U. S. application S. No. 378,684 filed 16th July, 1929. I have now found that materials which at some stage in their manufacture possess or are capable of acquiring some degree of plasticity may very advantageously be stretched by drawing them against a drag or resistance exerted by a gaseous stream moving so as to oppose the motion of the materials. The stretching process of the invention is particularly applicable to the manufacture of artificial materials by a dry spinning process, but is not to be regarded as limited thereto.

Any suitable gas may be employed in the invention. In general I prefer to use a current of air, preferably at a temperature above atmospheric temperature. As examples of other gases which have been found suitable mention may be made of nitrogen and carbon dioxide. Vapours of solvents or non-solvents for the material under treatment may also be used, alone or in conjunction with air or other gases, and may, especially when applied at temperatures above atmospheric, contribute to the plasticity of the materials.

The gaseous drag may be applied to the materials in any desired manner. Thus for example the materials may pass through an ejector device comprising two concentric hollow truncated cone-shaped vessels, the arrangement being such that a rapid flow of air or other gas through the annular space between the two vessels induces a flow in the inner vessel through which the materials pass in the opposite direction to that of the gas. The materials passing in at the convergent end of the inner cone and out at the expanded end are retarded by the gaseous stream passing through the apparatus in the opposite direction. The gas may issue from the apparatus through a tube, preferably flared, constituting an extension of the outer cone in the direction of flow, beyond the end of the inner cone. When this tube is flared the velocity of the effluent will be gradually reduced; thus the materials entering the apparatus will, on their way to the inner vessel, encounter a stream of progressively increasing velocity—i. e. the gaseous drag will be applied gradually.

This simple form of apparatus may be modified in many ways. Thus for example the simple conical form of inner vessel may be replaced by a number of similar truncated cone-shaped members, spaced along the axis of the outer vessel so that the constricted end of one cone projects into the open end of the next. The inducing stream of air or other suitable gas will then flow from the outer vessel through the annular space between successive cones into the axial space whence the induced and inducing streams will together issue through a tube constituting an extension of the last cone. The induced current will enter and the materials will leave the vessel by a hollow truncated cone-shaped member, the constricted end of which extends some way (for example half-way) into the expanded end of the first cone. The materials enter the vessel by the tube or vessel through which the gaseous stream issues, pass through the axial region of the inducer, and are drawn off through the tube or vessel by which the induced current enters, by means of any suitable winding or other drawing device. The tube or vessels through which the materials enter and the gaseous stream leaves the main vessel may taper from the open end towards the end connecting with the last cone of the inner vessel. On the other hand it may be of uniform cross-section along at least a part of its length. Thus the portion of smallest section may be of negligible length or may extend some distance beyond the main vessel in the direction of flow of the gas, the open end of the tube being flared so that the materials entering encounter a stream of velocity which at first increases progressively, then remains substantially constant throughout the constricted portion of the tube.

In an alternative form of apparatus the materials are drawn through a chamber which may by any suitable means be maintained at a lower pressure than the circumambient air or other gas. Thus a constant influx is produced and the apparatus is so designed that at least a part of the entering gas flows through the outlet by which the materials issue from the chamber, at a velocity sufficiently great to exert the required drag. The outlet for the materials may consist merely of an orifice in the end of the chamber, or may be prolonged in the form of a tube of uniform or varying section. The material may enter the chamber through a funnel or other suitably shaped vessel or aperture through which a, preferably slow, current flows in the same direction as the materials.

Whatever the form of apparatus employed the arrangement may be such that a current can if desired be caused to flow in such a direction as to assist the passage of the materials through the stretching vessel to the drawing off device. Such an arrangement greatly facilitates starting up. Thus by operating so that the flow throughout the apparatus is in the direction of travel of the threads and the like, these may readily be passed through the apparatus to the drawing device, and once this is in operation the direction of flow through the part of the apparatus in which the drag is to be applied may be reversed, so as to produce the drag.

As mentioned above, I prefer to employ air as the gas, but other suitable gases may be used. Further, the gas may contain solvents or softening agents for the artificial material, colouring agents or other gaseous, liquid, or solid treating agents. When the gaseous stream is desired to consist of or contain substances other than air, the vessel through which the countercurrent flows may conveniently be enclosed in a suitable cell into which the desired substances may be introduced in any suitable manner.

When the stretching process of the invention is applied in the manufacture of artificial materials by a dry spinning process, the ejector or other suitable device by means of which the gaseous drag is applied may be situated in the spinning cell itself, or may on the other hand be situated along any part of the path of the materials. Further the spinning jets or dies may be situated within the vessel in which the gaseous drag is produced, whether by induction or otherwise. When the process is applied to materials continuously with their production by a wet spinning process, the materials may be passed directly from the coagulating medium while still in a relatively plastic condition, through the ejector or other device. In order to facilitate stretching, the natural plasticity of the materials, which may be very small, may be increased by any suitable means. Again the materials may be treated at a stage in their manufacture in which they are relatively plastic. When the gaseous drag is applied to fully coagulated materials, continuously with their production by a wet or dry spinning process, or as a separate operation, special means may be necessary to induce the desired plasticity. When the stretching is effected continuously with production by wet spinning processes, relatively high boiling solvents or softening agents for the material may for example be contained in the spinning solution. Again, the materials may be treated with a softening agent at any stage in their passage to the drawing device. Thus for example solvents in liquid or gaseous form may be introduced into the counter-current itself and/or into any fluid current employed to assist the travel of the materials into the ejector or other device in which the gaseous drag is applied. When, for instance, air is employed to provide the counter-current in treating filaments or threads of cellulose acetate, it is convenient to inject a suitable swelling agent in the form of a mist into the air stream in the neighbourhood of the outlet through which the materials issue from the ejector or other stretching device. Or the solvent may be introduced in vapour form, preferably at a temperature in the neighbourhood of or above its boiling point. Alternatively, or in addition, the necessary plasticity may be induced by treatment with a liquid solvent or swelling agent.

Any suitable solvent or swelling agent for the base of the artificial materials may be employed. The choice of a solvent or swelling agent will naturally depend upon the nature of the material and the conditions under which the agent is applied. Thus, for example, when the softening operation comprises a bath treatment it will not in general be advisable to use agents of very low boiling point unless diluted or admixed with agents of higher boiling point. Further, the concentration of the solvent when employed in admixture will be determined according to the degree of softening desired and the time during which the material remains in contact with the treating agent. Among the large number of softening agents available for cellulose acetate mention may be made of acetone, methyl ethyl ketone, acetone oils, cyclohexanone, methyl cyclohexanone, diacetone alcohol, the mono- and dimethyl and ethyl ethers of ethylene glycol and other poly hydroxy alcohols, dioxane, phenol, tetrachlorethane, acetic acid, formic acid, ethyl formate, diethyl tartrate, ethyl lactate, ethylene chlorhydrin and $\alpha$-dichlorhydrin. Alcohols, for example, ethyl and methyl and particularly benzyl and amyl alcohols, may with advantage be employed at temperatures above atmospheric. The softening agent may comprise a mixture of two or more solvents or latent solvents. Mixtures of the so called "polar" with "non-polar" liquids in proportions depending upon the characteristics of the cellulose ester treated may be employed, for example mixtures of methyl or ethyl alcohol with methylene or ethylene dichlorides. If very low boiling solvents are used, provision should be made for preventing excessive loss of the solvent. The treating agent when applied in liquid form may contain inorganic salts having a solvent or swelling action on the cellulose derivative, for example aqueous solutions of zinc chlorides or of thiocyanates or alcohol solutions of calcium chloride. The application of softening agents in liquid or gaseous form is illustrated in U. S. Patent No. 1,709,470. U. S. applications S. Nos. 463,658 filed 25th June, 1930, and 463,932 filed 26th June, 1930, describe processes in which a softening agent is applied continuously with production by a dry spinning process. U. S. application S. No. 476,334 filed 19th August, 1930, describes the application in such processes of liquid softening agents. In the process of U. S. application S. No. 476,333 filed 19th August, 1930, liquid softening agents are applied continuously with production by wet spinning processes. U. S. applications S. Nos. 402,785 filed 26th October, 1929, 469,622 filed 21st July, 1930, and 418,414 filed 3rd January, 1930 describe the addition of softening agents to the spinning solution, and illustrate spinning processes in which the material may retain some degree of plasticity on emerging from the coagulating medium or from a subsequent treatment medium. Such processes may very advantageously be combined with the stretching process of the present invention.

Among solvents for nitrocellulose mention may be made of acetone, wood spirit, acetone oils, diacetone alcohol, benzyl alcohol, methyl, ethyl, propyl and amyl acetates and formates, and methyl and ethyl ethers of ethylene glycols.

If the solvent or swelling agent is such as adversely to affect the tensile strength or other properties of the materials if left therein, it should be washed out or otherwise removed after the materials have undergone the desired stretch. This may be done continuously with the treatment according to the invention, or as a separate operation.

When the ejector principle is applied to produce the gaseous counter-current, any suitable gas may be forced through the annular space between the outer and inner vessels in order to induce the desired counter-current. In general, I prefer to employ air both as inducing and as the induced gas.

The tension necessary to draw the materials through the gaseous counter-current may be obtained in any desired manner. It may, for example, be applied directly by any bobbin, swift, spinning box or the like employed to collect and/or twist the materials; or by means of positively driven rotating guide rolls along the path of the materials; or in cases in which the materials are subjected to an after-treatment with liquid media, at least a part of the tension required may be obtained by causing the liquid medium to flow in the same direction as the materials, for example as described in British application No. 1562/31 filed 16th January, 1931.

Special effects may be produced during the stretching process of the invention, for example by introducing suitable agents into the gaseous counter-current. Thus by introducing a finely powdered abrasive, for example titanium oxide or barium sulphate, materials of dull lustre may be obtained. Provided the materials are in a sufficiently plastic state various effects may be produced by injecting into the counter-current solid materials, for example finely powdered metals, which adhere to the materials. In this way metallic and other effects may be produced as described in U. S. application S. No. 476,318 filed 19th August, 1930.

The materials may be subjected continuously with the process of the invention to any desired after-treatment. For example they may be treated so as to modify their lustre or to increase or decrease any tendency they may have to undergo delustring when subjected to the action of delustring agents; they may be dyed or otherwise coloured to produce fast shades or temporary colourations useful in identification; they may be weighted, mordanted, or in the case of cellulose esters, saponified so as to modify their dyeing properties; they may be subjected to sizing or other processes designed to facilitate subsequent textile treatments.

The invention has been described with particular reference to the treatment of filaments and the like of cellulose acetate. The process is, however, applicable to a great variety of materials, among which may be mentioned other esters of cellulose, for example nitrocellulose, cellulose formate, propionate, and butyrate; mixed esters, e. g. cellulose nitro-acetate; cellulose ethers, for example methyl, ethyl and benzyl cellulose; and mixed ethers and ether-esters of cellulose. I prefer to apply the stretching process to filaments and the like which have not been twisted. Again, when the process is applied in the production of ribbons and the like, the most valuable results are obtained when the materials are relatively very thin.

Various types of apparatus which may be employed according to the present invention are shown in the accompanying drawing, but it is to be clearly understood that they are given by way of example only and that the invention is in no way limited thereto.

Fig. 1 shows a type of dry-spinning cell 4 in which the gaseous drag is obtained by means of a current of air or other gas introduced by the pipe 12 and passing through the annular spaces between the walls of the cone-shaped injector devices 9, which are held in position in the cell by the supports 11. By means of valves 24 the current through the injectors may be regulated to any desired degree. The bundle of filaments 5 extruded from the spinning jet 6 passes down the centre of the injector-devices 9, where it is exposed to the drag exerted by the gaseous current, over a guide 10 and then round a draw-roller 7 positioned outside the cell, being finally taken up by a cap-spinning device 8. Additional evaporative medium may if desired be introduced through an inlet 14, while the atmosphere may be withdrawn through a pipe 13 communicating with a header 15.

Figs. 2 and 3 show an alternative form of apparatus in which the gaseous drag is obtained by the use of a high degree of suction applied by means of the pipe 21. The bundle of filaments 5 extruded from the spinning jet 6 passes down an annular chamber 17, the bottom of which is constricted as shown at 18. On account of the high degree of suction exerted through the pipe 21 the bundle of filaments is exposed in this chamber to the drag exerted by a current of air or other suitable gas moving with high velocity in the opposite direction. The chamber 17, 18, is conveniently formed by two plates 16 carried on guide rods 19, as is shown in the plan view in Fig. 3. These may be separated in the positions shown at 16' when spinning is to be commenced, and then when the filament bundle has been formed they may be brought together to form the annular chamber surrounding the bundle of filaments. A suitable packing 23 is attached to one of the plates 16 in order that a gas-tight connection may be made. The plates are held together by wing nuts and bolts 22 fitting into slots 20. As with the previous apparatus, the filaments may be carried over a guide and round a draw-roller to a cap-spinning apparatus, or to a spinning box or any other suitable form of collector device.

Whichever form of spinning apparatus is adopted it is desirable that the jet orifices should be spaced as far apart as is consistent with other requirements, in order to diminish the risk of the filaments sticking together while in the plastic condition. Alternatively a guide plate or other device may be inserted in the cell in a suitable position in order to keep the filaments apart during their passage through the upper part of the spinning cell.

What I claim and desire to secure by Letters Patent is:—

1. In the production or treatment of artificial filaments, threads, ribbons, films and similar materials containing a cellulose derivative, the step of applying, at a point spaced apart from the point of extrusion of the solution, a drag opposing the travel of the materials by means of a moving body of gas while the materials are in a plastic condition so as to stretch the materials.

2. Process for the production of artificial filaments, threads, ribbons, films and similar products by dry spinning processes, comprising extruding a solution containing a cellulose derivative through suitable orifices into a spinning cell and drawing, at a point spaced apart from the point of extrusion of the solution, the products through a gaseous stream traveling at such a velocity as to exert a drag opposing the motion of the products so as to stretch the products.

3. Process for the production of artificial filaments, threads, ribbons, films and similar products by dry spinning processes, comprising extruding a solution containing an organic derivative of cellulose through suitable orifices into a spinning cell and drawing, at a point spaced apart from the point of extrusion of the solution, the products through a gaseous stream traveling at such a velocity as to exert a drag opposing the motion of the products so as to stretch the products.

4. Process for the production of artificial filaments, threads, ribbons, films and similar products by dry-spinning processes, comprising extruding a solution containing cellulose acetate through suitable orifices into a spinning cell and drawing, at a point spaced apart from the point of extrusion of the solution, the products through a gaseous stream traveling at such a velocity as to exert a drag opposing the motion of the products so as to stretch the products.

5. Apparatus for the production of artificial filaments, threads, ribbons, films and similar products, comprising a spinning cell, a spinning jet in the cell, and means at a point spaced apart from said spinning jet for applying a gaseous stream to the extruded products in such a manner and at such a speed as to exert a drag opposing the travel of the products sufficient to stretch the products.

6. Apparatus for the production of artificial filaments, threads, ribbons, films, and similar products, comprising a spinning cell, a spinning jet in the cell, a device consisting of at least one tube adapted to surround the filaments, and means for inducing a gaseous stream to flow through the said tube in a direction opposite to the direction of travel of the products, at a velocity sufficient to exert a drag on the products, and adapted to cause the stretching of the products.

7. Apparatus for the production of artificial filaments, threads, ribbons, films, and similar products, comprising a spinning cell, a spinning jet in the cell, a device consisting of at least one conical tube adapted to surround the filaments, and means for inducing a gaseous stream to flow through the said tube in a direction opposite to the direction of travel of the products, at a velocity sufficient to exert a drag on the products, and adapted to cause the stretching of the products.

8. Apparatus according to claim 6 wherein the means for inducing the high velocity gaseous stream comprises an injector device.

9. Apparatus according to claim 6 wherein the means for inducing the high velocity gaseous stream comprises a suction device.

WILLIAM IVAN TAYLOR.